July 21, 1931. H. HILL 1,815,147

SPRING WHEEL FOR AUTOMOBILES AND OTHER VEHICLES

Filed July 9, 1930

H. Hill
INVENTOR

By Marks & Clerk
Attys.

The yoke pieces 15 are provided in their bases with recesses 18 adapted to engage the spherical surfaces 4 thereby permitting a certain degree of freedom of motion between the yoke pieces and the inner rim element.

In the modification illustrated in Figure 3, the yoke piece is in the form of a cup-shaped element 19 provided with slots 20 within which the pins 17 associated with the outer rim element are slidably engaged. The resilient members, as above indicated, may be in the form of metallic springs or may be formed of rubber, and in the former type of construction, see Figures 1 and 2, helical springs 21 are provided adapted at the ends adjacent to the inner rim element to bear against the interiors of the bases of the yoke pieces 15 and at their other ends against outwardly directed flanges 22 formed on the ends of the tubular stirrup members 12 adjacent to the outer rim element; whereas in the latter type of construction, see Figure 3, rubber blocks 23 are provided and are held in position between the stirrup members 14 and the cup-shaped element 19.

As indicated in Figures 1 and 2, the outer rim element may be in the form of an annulus of L-section to which is removably secured the side plate 24 of annular form, and the outer rim element is provided on its exterior peripheral surface with a tyre 25 and on its inner peripheral surface with rubber pads 26 secured in position by means of the steel plates 27.

Pivotally connected with the outer rim element by means of the pins 28 are the sliding spokes 29, the housings for the pivotal connections being provided by bosses 30 formed on the outer rim element and provided with apertures 31 sufficiently large to permit a certain degree of motion of the sliding spokes 29 about the pins 28, apertures 32 being provided in the inner rim element through which the sliding spokes project into the cylinder members 33 pivotally connected at 34 with the central element 3 of the wheel, and between the hub and the periphery of the central element 3 are fixed radial members 35 between which and the cylinder members 33 are provided rubber blocks 36 adapted to form resilient connections therebetween and to permit a limited degree of relative rotational motion between the outer rim element and the central element.

As will be understood the above detailed description is furnished to illustrate by way of example certain suitable manners of carrying the invention into effect, and the invention is not to be considered as limited to the details of construction illustrated since many modifications of these details may be effected without exceeding the scope of the invention.

Having now described my invention, what I claim as new and desire to secure by Letters Patent is:—

1. A wheel for vehicles comprising an outer rim element, a central element, an inner rim element located on said central element, radial elements pivoted on the outer rim element, means associated with said central element adapted telescopically to engage said radial elements, resilient members located between said inner rim element and said outer rim element adapted to operate in compression both when they are above as well as when they are below the centre of the wheel.

2. A wheel for vehicles comprising an outer rim element, a central element, an inner rim element located on said central element, radial elements pivoted on said outer rim element, means associated with the central element adapted telescopically to engage the radial elements, resilient means adapted to permit a limited degree of relative rotational motion between the outer rim element and said central element, stirrup members connected between the inner rim element and the outer rim element, and resilient members arranged between said stirrup members adapted to operate in compression when they are above as well as when they are below the centre of the wheel.

3. A wheel for vehicles comprising an outer rim element, a central element, an inner rim element located on said central element, radial elements pivoted on said outer rim element, means associated with the central element adapted telescopically to engage the said radial elements, resilient supports for the said means adapted to permit a limited degree of relative rotational motion between the outer rim element and the central element, stirrup members associated with said inner rim element each of which is provided at its extremity remote from the inner rim element with an outwardly directed flange, further stirrup members associated with the first-mentioned stirrup members, resilient members encircling said first-mentioned stirrup members and contacting at their extremities respectively with the flanges on the first-mentioned stirrup members and the inner surfaces of the bases of the said second-mentioned stirrup members, slots in the second-mentioned stirrup members, and pins located on the outer rim element adapted to engage in said slots whereby said resilient members may operate in compression both when above as well as when below the centre of the wheel.

4. A wheel for vehicles comprising an outer rim element, a central element, an inner rim element located on said central element, radial elements pivoted on said outer rim element, cylinder members pivotally connected with the central element and adapted telescopically to engage the said Patented July 21, 1931

1,815,147

UNITED STATES PATENT OFFICE

HERBERT HILL, OF BRADFORD, ENGLAND

SPRING WHEEL FOR AUTOMOBILES AND OTHER VEHICLES

Application filed July 9, 1930, Serial No. 466,857, and in Great Britain August 30, 1929.

This invention relates to spring wheels for automobile and other vehicles of the kind having telescopic radial elements or spokes pivoted, for example, to side plates secured to the hub, on axes located on a circle whose centre is the axis of the wheel and connecting the hub with the wheel rim and optionally radial members secured in fixed relationship with the nave or hub of the wheel between the pivoted radial elements, resilient means adapted to permit a limited degree of relative rotational motion between the rim and the nave or hub of the wheel being in such case conveniently arranged between the fixed radial members and the pivoted radial elements or spokes.

In the specification of United States Letters Patent No. 1,628,594, granted to me on May 10th, 1927, I have described and claimed a construction of spring wheel of the kind in question in which an inner rim element rigidly connected with the hub is provided and between this inner rim element and an outer rim element resilient members are located.

According to a modified construction forming the subject-matter of British Letters Patent No. 297,858, dated June 27th, 1927, the complete specification of which was accepted on September 27th, 1928, the resilient members located between the rim elements are arranged to support the load above the hub as well as when they are below the centre of the wheel.

The object of the present invention is to provide an improved construction of spring wheel of the kind specified and in particular to provide an improvement in or modification of the construction of spring wheel claimed in the United States specification No. 1,628,594 and the British specification No. 219,623, dated April 17th, 1924, the complete specification of which was accepted on July 31st, 1924, or as claimed in the said British specification as improved upon or modified by the invention on which a British patent of addition, No. 297,858, was granted.

According to the present invention the resilient members located between the rim elements are arranged to operate in compression both when they are above as well as when they are below the centre of the wheel and are arranged between stirrup members connected respectively with the inner and outer rim elements.

The invention will be described further in detail by way of example and with reference to the accompanying drawings in which:—

Figure 2 is a fragmentary sectional elevation illustrating certain details of the construction illustrated in Figure 1, while

Figure 1:
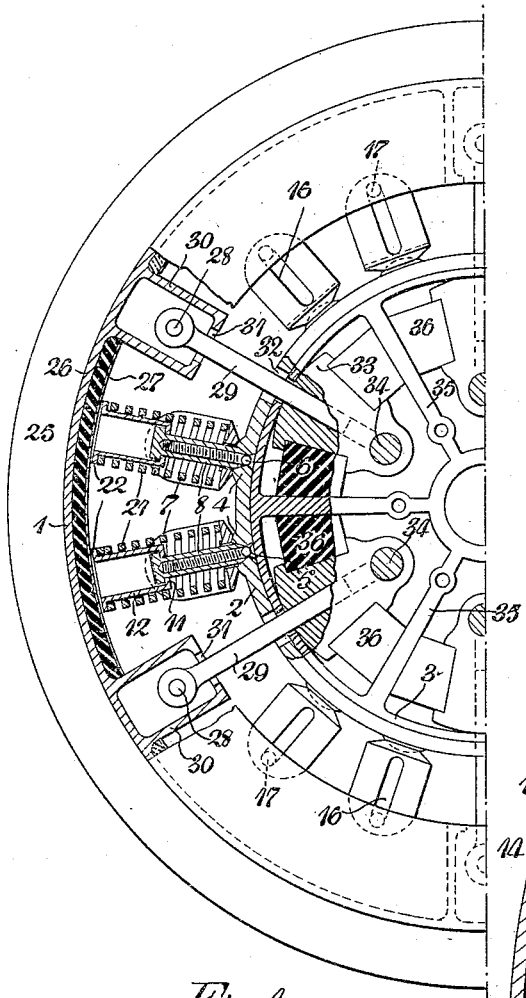
Figure 1 is a fragmentary view partly in section illustrating one construction in accordance with the invention, in which resilient members in the form of helical springs are employed.

In the drawings, 1 indicates the outer rim element and 2 the inner rim element located on a central element 3. The inner rim element is provided at intervals with spherical surfaces 4 within which are formed recesses 5 adapted to provide bearing surfaces for the heads 6 of the T-headed bolts 7, the stems of which are externally screw-threaded and are adapted to engage the internally screw-threaded tubular members 8, the latter being formed with heads 9, provided with slots 10 for adjusting purposes and adapted to engage, in the construction illustrated in Figures 1 and 2, inwardly directed flanges 11 formed in the tubular stirrup members 12 within which the tubular members 8 are adapted to be telescopically engaged, and in the construction illustrated in Figure 3 the inwardly directed flanges 13 formed in the corresponding stirrup members 14 within which, as in the previous case, the tubular members 8 are adapted to be telescopically engaged.

Figure 2:
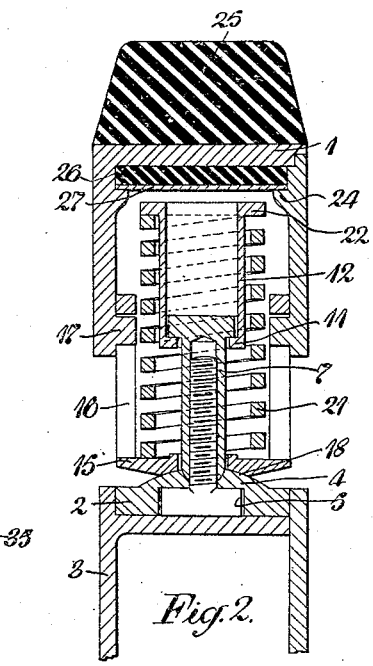
Figure 3:
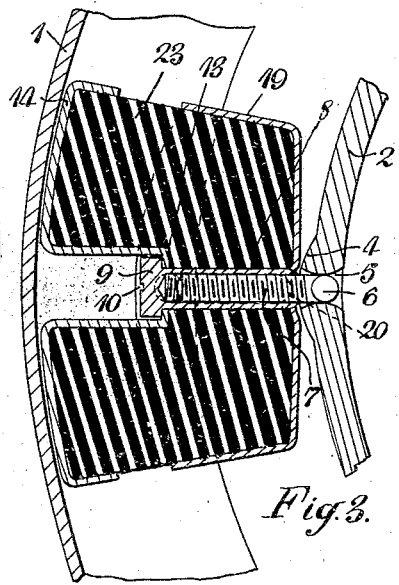
Figure 3 illustrates details of a construction in which the resilient members are formed of rubber.

Located on the inner rim element and normally in engagement therewith, see Figures 1 and 2, are stirrup members in the form of yoke pieces 15, provided with slots 16 in which are slidably engaged pins 17 associated with the outer rim element.

radial elements adjacent to their extremities remote from the outer rim element, fixed radial members on said central element, rubber blocks located between the cylinder members and the fixed radial members adapted to permit a limited degree of relative rotational motion between the outer rim element and the central element, inner tubular members provided with enlarged heads associated with the inner rim element, outer tubular members within which said inner tubular members are adapted slidably to engage, said outer tubular members being provided at their extremities remote from the outer rim element with inwardly directed flanges adapted to bear against the enlarged heads of said inner tubular members and at their extremities adjacent said outer rim element with outwardly directed flanges, stirrup members provided with slots located on the inner rim element, pins on the outer rim element adapted to engage within said slots, resilient members encircling said inner and outer tubular members and contacting respectively at their extremities with the said outwardly directed flanges and the inner surfaces of the bases of the said stirrup members, whereby said resilient members may operate in compression both when above as well as when below the centre of the wheel.

5. A wheel for vehicles comprising an outer rim element in the form of an annulus of L section to which is removably secured a side plate of annular form, a tyre secured to the outer peripheral surface of said outer rim element, rubber pads located in position against the inner peripheral surface of said outer rim element, steel plates engaging said outer rim element and adapted to secure the said rubber pads in position against the inner peripheral surface of the said outer rim element, a central element, an inner rim element located on said central element and provided at intervals with spherical surfaces, recesses in said spherical surfaces, radial elements pivoted on said outer rim element, cylinder members pivotally connected with the central element adapted telescopically to engage the said radial elements adjacent to their extremities remote from the outer rim element, fixed radial members on said central element, rubber blocks located between the cylinder members and the fixed radial members adapted to permit a limited degree of relative rotational motion between the outer rim element and the central element, T-headed bolts provided with screw-threaded stems adapted to engage within the recesses in the spherical surfaces on the said inner rim element, inner tubular members provided with enlarged heads and internally screw-threaded stems adapted to engage the stems of the said T-headed bolts, outer tubular members within which said inner tubular members are adapted slidably to engage, said outer tubular members being provided at their extremities remote from the outer rim element with inwardly directed flanges adapted to bear against the enlarged heads of the said inner tubular members and at their extremities adjacent to the outer rim element with outwardly directed flanges, stirrup members having in their bases recesses corresponding with and adapted to co-operate with the spherical surfaces on the inner rim element, slots in said stirrup members, pins on the outer rim element adapted to engage within the said slots, resilient members encircling said inner and outer tubular members, said resilient members contacting at their extremities respectively with the outwardly directed flanges on the outer tubular members and the inner surfaces of the bases of the said stirrup members and adapted to operate in compression both when above as well as when below the centre of the wheel.

In testimony whereof I have signed my name to this specification.

HERBERT HILL.